United States Patent
Parsons et al.

(10) Patent No.: US 6,293,516 B1
(45) Date of Patent: Sep. 25, 2001

(54) REDUCED-ENERGY-CONSUMPTION ACTUATOR

(75) Inventors: Natan E. Parsons, Brookline, MA (US); Xiaoxiong Mo, Nashua, NH (US)

(73) Assignee: Arichell Technologies, Inc., West Newton, MA (US)

( * ) Notice: Subject to any disclaimer, the term of this patent is extended or adjusted under 35 U.S.C. 154(b) by 0 days.

(21) Appl. No.: 09/422,553

(22) Filed: Oct. 21, 1999

(51) Int. Cl.[7] .................................................. F16K 31/08
(52) U.S. Cl. ......................... 251/129.04; 251/65; 361/160
(58) Field of Search ............................. 137/554; 251/65, 251/129.04, 129.1; 361/160; 123/90.11; 73/119 A

(56) References Cited

U.S. PATENT DOCUMENTS

| | | | |
|---|---|---|---|
| 4,097,786 | 6/1978 | Lund | 318/282 |
| 4,887,032 | 12/1989 | Hetrick | 324/207 |
| 4,894,698 | 1/1990 | Hijikigawa et al. | 357/26 |
| 5,032,812 | 7/1991 | Banick et al. | 335/17 |
| 5,109,885 | * 5/1992 | Tauscher | 137/554 |
| 5,127,625 | * 7/1992 | Kleinhappl | 251/129.17 |
| 5,169,118 | * 12/1992 | Whiteside | 251/129.04 X |
| 5,375,811 | 12/1994 | Reinicke | 251/129.16 |
| 5,408,369 | 4/1995 | Miura et al. | 360/75 |
| 5,433,245 | 7/1995 | Prather et al. | 137/554 |
| 5,481,187 | 1/1996 | Marcott et al. | 324/207.16 |
| 5,574,617 | 11/1996 | Shimanuki et al. | 361/154 |
| 5,583,434 | 12/1996 | Moyers et al. | 324/207.16 |
| 5,584,465 | * 12/1996 | Ochsenreiter | 251/65 |
| 5,600,237 | 2/1997 | Nippert | 324/207.16 |
| 5,636,601 | * 6/1997 | Moriya et al. | 123/90.11 |
| 5,708,355 | * 1/1998 | Schrey | 323/282 |
| 5,716,038 | 2/1998 | Scarffe | 251/30.03 |
| 5,747,684 | * 5/1998 | Pace et al. | 73/119 A |
| 5,787,915 | * 8/1998 | Byers et al. | 137/1 |
| 5,797,360 | * 8/1998 | Pischinger et al. | 123/90.11 |
| 5,804,962 | 9/1998 | Kather et al. | 324/207.16 |
| 5,905,625 | 5/1999 | Schebitz | 361/154 |
| 5,964,192 | 10/1999 | Ishii | 123/90.11 |
| 6,044,814 | 4/2000 | Fuwa | 123/90.11 |
| 6,155,231 | 12/2000 | Adachi et al. | 123/399 |
| 6,158,715 | 12/2000 | Kirschbaum | 251/129.06 |

FOREIGN PATENT DOCUMENTS

| | | |
|---|---|---|
| 0663552A1 | 7/1995 | (EP) . |
| 0942214A1 | 9/1999 | (EP) . |
| 2590088 | 5/1987 | (FR) . |

* cited by examiner

Primary Examiner—John Rivell
(74) Attorney, Agent, or Firm—Cesari and McKenna, LLP

(57) ABSTRACT

A latching-valve system (10) includes a piezoelectric transducer (44) mounted on its housing (16). To change the valve's state, a microcontroller (54) causes a valve driver (58) to drive current through the actuator's coil (12). It continues driving current through the coil (12) until the transducer's output reaches a magnitude characteristic of the disturbance that typically results when the actuator's armature (22) reaches the end of its travel. At that point, the microcontroller (54) stops driving current through the coil. If the characteristic sound does not occur within a predetermined duration, the microcontroller (54) causes a voltage-multiplier circuit (Q1, L1, D1) to increase the voltage that the valve driver (58) applies to the coil.

19 Claims, 2 Drawing Sheets

REDUCED-ENERGY-CONSUMPTION ACTUATOR

BACKGROUND OF THE INVENTION

The present invention is directed to latching actuators and in particular to the systems that control them.

For many automatic flow-control installations, such as automatic toilet and urinal flushers, one particularly stringent design requirement is that the system consume as little power as possible. The reason for this varies from case to case, but it is typically that the circuitry and other apparatus required to make the flusher's operation automatic are quite frequently provided on a retrofit basis. That is, manual flushers are being converted to automatic operation. Unless the retrofit unit can be battery-operated or otherwise self contained, the installation process is quite expensive, typically requiring that walls be opened to provide the necessary wiring. That expense can be avoided if the automatic system is battery-operated, but a battery-operated system's acceptability depends greatly on battery life.

A significant determinant of the battery's longevity is the energy that valve actuation consumes. So retrofit systems tend to employ valves of the latching variety, i.e., valves whose actuators require power to open or close the valve but not to keep it open or closed. The use of valves that employ such actuators has greatly extended the feasibility of employing battery-operated systems. Still, such systems would be more attractive if battery longevity could be extended further.

SUMMARY OF THE INVENTION

The present invention achieves this result by reducing the energy waste that usually occurs in driving the actuator's armature. The approach employed by the invention involves determining when the armature has reached the end of its travel. In accordance with one of the invention's aspects, actuator-coil drive ends when it has. This can reduce energy consumption greatly, because coil-drive duration thereby does not always need to be long enough to meet worst-case requirements. This can result in a significant battery-longevity increase.

In accordance with another of the invention's aspects, the drive applied to the actuator coil is increased if the armature has not reached the end of its travel within a predetermined duration. This allows less coil drive to be used ordinarily, since the coil drive does not always need to be great enough to overcome the resistance that can occasionally result from, for instance, accretion of foreign matter. This coil-drive reduction, too, can contribute to longevity.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
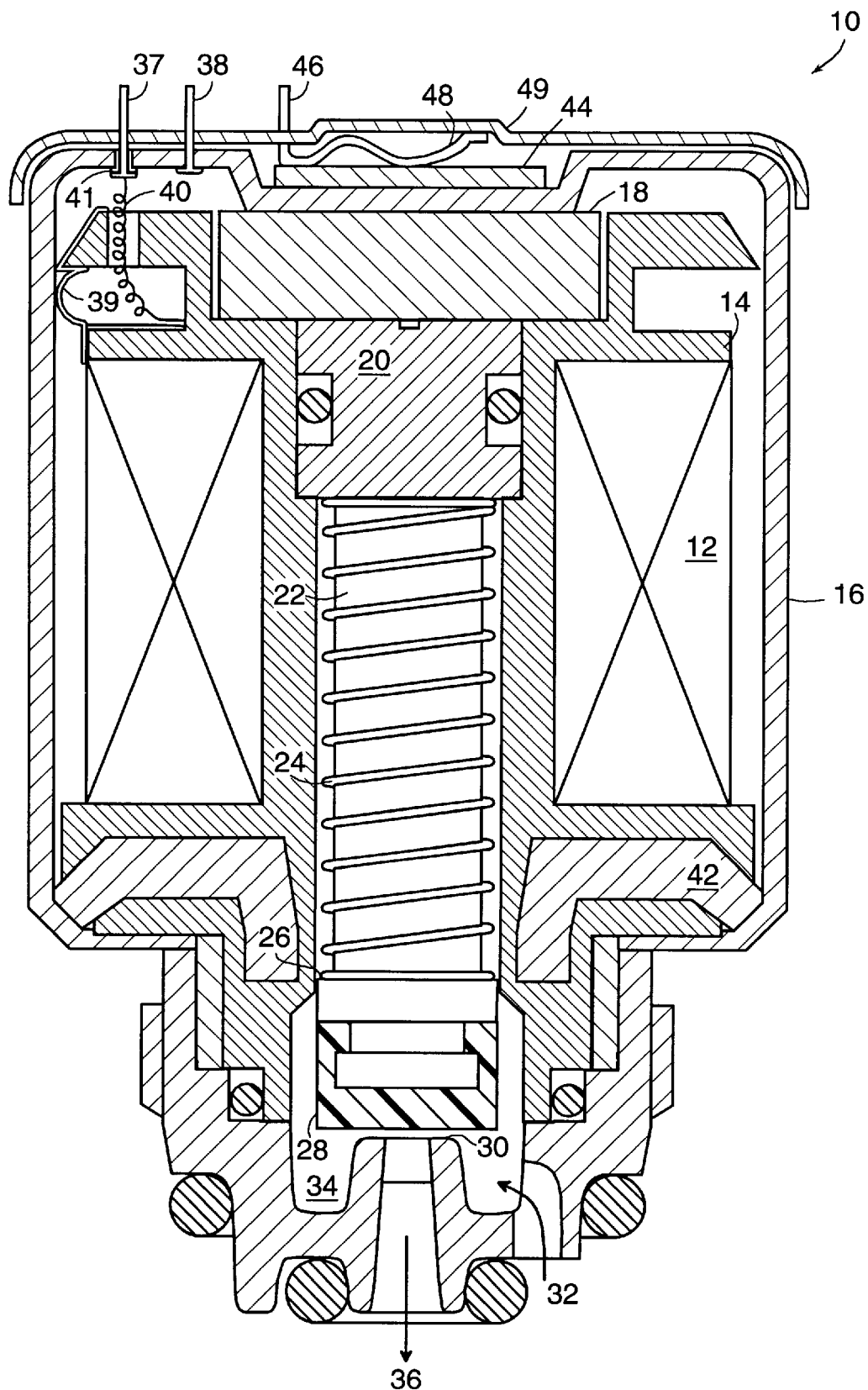
FIG. 1 is a cross-sectional view of a latching valve on which a piezoelectric transducer has been mounted.

FIG. 1 shows in cross section a valve system 10 that includes a latching actuator. The actuator includes a coil 12 wound on a bobbin 14 mounted in an actuator housing 16. In the illustrated position, a latching magnet 18 mounted on the bobbin 14 acts through a rear pole piece 20 to hold an armature 22 in an upper position against the force that a return spring 24 exerts on a shoulder 26 formed near the armature's lower end. In the FIG. 1 position, a resilient valve member 28 at the bottom of the armature is spaced from a valve seat 30 formed about a valve inlet 32. Fluid can therefore flow through inlet 32 and an annular cavity 34 to the valve's outlet 36.

To close the valve, a drive voltage applied through terminals 37 and 38 drives current through the coil 12. Terminal 38 is in ohmic contact with the conductive housing 16, which a contact spring 39 in turn connects to one end of the coil 12. A lead 40 connects the coil 12's other end to terminal 37, and a non-conducting bushing 41 insulates terminal 37 from the housing 16.

The drive voltage's polarity is such that the resultant magnetic flux, guided largely by the ferromagnetic housing 16, rear pole piece 20, and front pole piece 42, opposes that of the permanent magnet 18. This breaks the magnet 18's hold on the armature 22 and allows the return spring 24 to urge the valve member 28 onto the valve seat 30. Once the valve has thus closed, the return spring keeps it closed without any further assistance from the coil; the armature 22's increased distance from the magnet makes the magnetic force on the armature 22 less than that of the return spring 24.

To open the valve, coil drive is applied to leads 37 and 38 in the opposite direction, so the resultant flux reinforces that of the permanent magnet 18 and overcomes the force of the return spring. The armature 22 therefore returns to the FIG. 1 position, where the permanent magnet 18's force is great enough to hold the armature 22 against the return spring 24's force without assistance from the coil.

Because of the latching valve's bistable nature, control circuits that operate it typically discontinue current flow after the valve has reached the desired state. Since the time required for the valve to reach the desired state can vary widely, conventional control circuits make the current-flow duration relatively long so that it will be adequate for worst-case conditions. Since most actuations are not performed under worst-case circumstances, though, coil drive typically continues for some time after the valve reaches its stable position. This is a waste of battery energy. To reduce this waste, a system that employs the present invention monitors the armature to determine whether the armature has reached its endpoint, and it stops applying coil drive when that occurs. To this end, the illustrated embodiment takes advantage of the sound that the armature makes when it reaches either end of its travel.

We use the term sound here in the broad sense of a pressure or strain wave. In most embodiments, moreover, the predominant frequency components of the "sound" are typically above the audible range. The illustrated embodiment's sensor is a piezoelectric transducer 44 that responds to vibrations in the housing wall. The piezoelectric element 44's size and shape have typically been so chosen as to maximize its response to the predominant frequency components, and it normally is mounted in a location where the sounds to be detected are greatest in amplitude or most distinguishable from noise.

A terminal 46 provides electrical communication to one of the transducer 44's electrodes through a contact spring 48 that a plastic cap 49 secured to the housing holds in place. The transducer 44's other electrode can share terminal 38 with the coil because the transducer is secured to the housing 16 by conductive bonding between the housing and that electrode.

Figure 2:
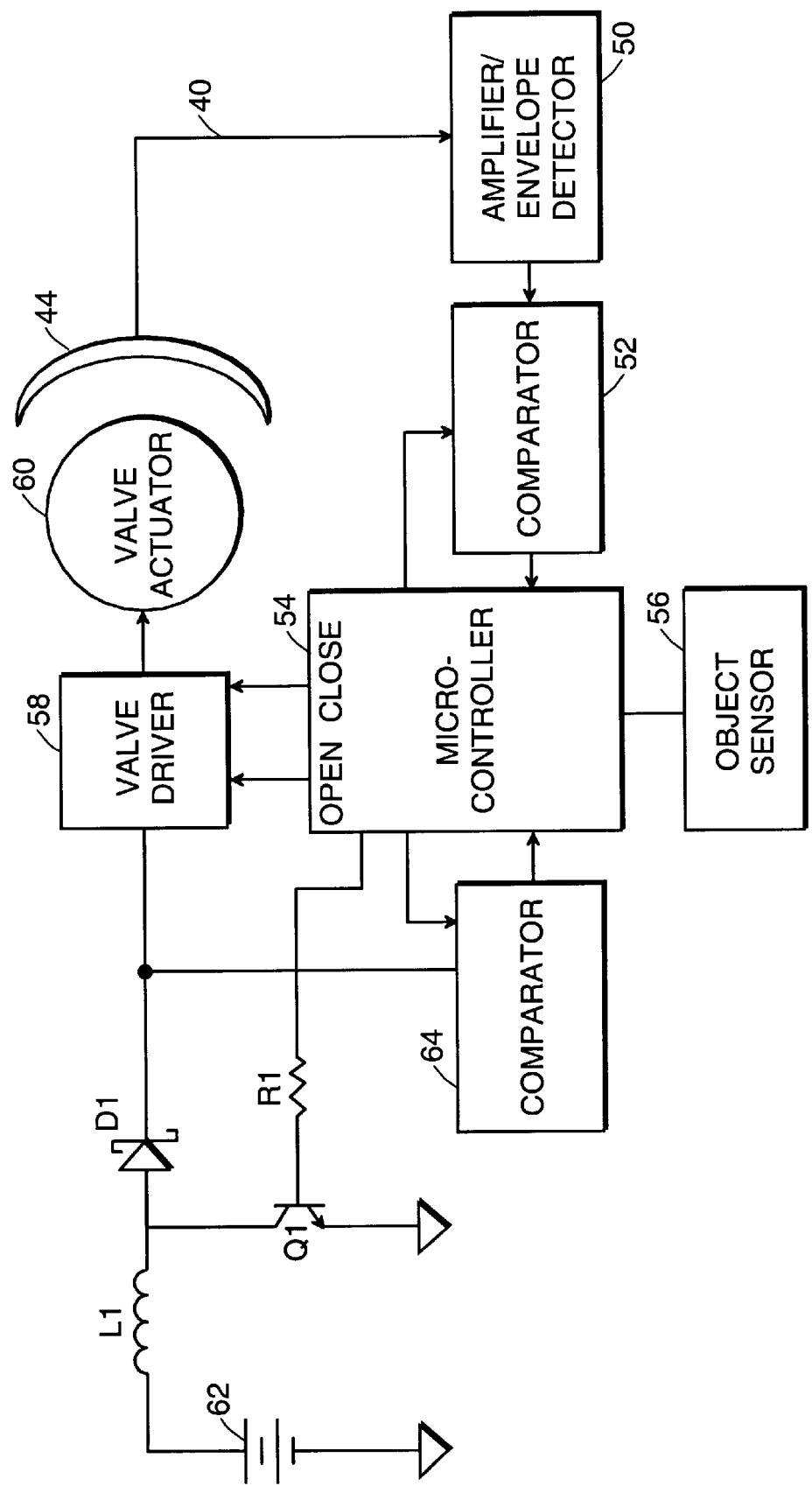
FIG. 2 is a block diagram of a control system for the valve's actuator.

As FIG. 2 shows, a control circuit for the valve includes a sensor amplifier and envelope detector 50, which receives the transducer output. The amplifier and envelope detector 50 includes an amplifier tuned to the expected sound's predominant (typically ultrasonic-range) frequency components, rectifies the resultant filtered signal, and low-pass filters the result to produce an output representative of the tuned-amplifier output's envelope. When the armature 22 reaches an endpoint and causes housing vibration, the resultant envelope value exceeds a threshold that a comparator 52 applies. Since in the illustrative embodiment the sonic amplitude is higher when the valve opens than when it closes, a microcontroller 54 sets a comparator threshold whose value when the valve is being opened is different from the value it has when the valve is being closed.

A microcontroller 54 may operate the valve in response to triggering by an object sensor 56. For example, it may open the valve when the sensor detects user's leaving the flusher's vicinity, and it may then close it once the valve has been open for a predetermined duration. To open the valve, the microcontroller sets an OPEN signal applied to a valve-driver circuit 58. This causes that circuit to drive current through the actuator 60's coil in the direction that will cause the valve to open.

When that current starts flowing, comparator 52's output initially indicates that amplifier 50's output is less than the threshold, so the amplifier is not receiving sound of a magnitude consistent with the armature's reaching the end of its travel. The microcontroller 54 therefore keeps the OPEN signal asserted. But comparator 52's output changes in response to the sound made by the armature 22 at the end of its travel. When the armature 22 has reached that point, the valve will stay open without current flow, so the microcontroller de-asserts its OPEN output and thereby causes the valve driver 58 to stop applying drive current to the actuator 60's coil. The result usually is that the current-flow duration has been much less than the time required to open the valve under worst-case conditions, so the system has saved considerable energy.

To close the valve, the microcontroller 54 asserts its CLOSE output and thereby causes the valve driver 58 to drive the actuator 60 in the opposite direction. Again, the microcontroller allows current flow only until comparator 52 informs it that the armature has reached the end of its travel.

The invention can be used to control not only the drive signal's duration but also its magnitude. A coil-drive level high enough for ordinary operation may occasionally be inadequate, and the coil-drive level can be increased if the armature fails to reach the endpoint. One way to increase the coil-drive level is to increase the voltage on capacitors discharged through the actuator coil.

FIG. 2 depicts the valve driver 58 as being powered by a battery 62. The valve driver 58 typically includes energy-storage capacitors, which the battery 62 charges up between actuations through an inductor L1 and a Shottky diode D1. When the microcontroller 54 asserts its OPEN or CLOSE signal, the driver discharges the capacitors through the actuator 60's coil. Ordinarily, it is the voltage of battery 62 itself that determines the voltages to which the capacitors will be charged, and this in turns determines coil current and thus armature force.

Now, factors such as the accretion of foreign matter may make it harder than usual to open or close the valve. But energy use that normally is unnecessarily high would result if the battery voltage were set high enough to deal with such more-difficult circumstances. The illustrated embodiment therefore uses a battery-voltage level that is adequate for normal situations but not for more-difficult ones.

Instead, it increases the capacitor voltage if the armature has not reached the end of its travel within a predetermined maximum current-flow duration. Specifically, the microcontroller 54 turns the valve driver off temporarily when the predetermined maximum current-flow duration is reached, and it begins to pulse a transistor Q1 through a current-limiting resistor R1. During each pulse, the transistor draws current from the battery through inductor L1. Because of diode D1, though, it does not discharge the valve driver's capacitors. At the end of each pulse, transistor Q1 turns off, and the resultant electromotive force in inductor L1 causes current to continue to flow and thereby charge the drive circuit's capacitors through diode D2 even if those batteries' voltage exceeds that of the battery 62. So those capacitors can be charged to voltages that exceed the battery's.

To achieve the appropriate capacitor voltage, a comparator 64 compares the capacitor voltage to a level that microcontroller 54 sets. In response to the comparator's resultant output, the microcontroller increases the pulses' duty cycle if the capacitor voltage is less than the threshold, and it decreases their duty cycle if the capacitor voltage exceeds the threshold. The threshold is set higher than the battery voltage, so the force on the armature is greater and more likely to open or close the valve when the microcontroller then turns the valve driver on again.

The illustrative embodiment is only one of many that can employ the present invention's teachings. For example, although we prefer to use a sonic sensor—in particular, an ultrasonic transducer-other ways of detecting the end of armature travel can be used instead. Also, although the illustrated embodiment controls coil-drive duration both when the valve is being opened and when it is being closed, some embodiments may control that duration only during opening or only during closing. And latching-actuator systems that operate mechanisms other than valves can also benefit from the present invention's teachings.

Moreover, although we have employed a simple amplitude criterion to determine whether the armature has reached the end of its travel, other criteria may be found preferable for some applications. For instance, the sonic signal could be sampled and compared by signal processing with a stored waveform known to be characteristic of the armature's reaching one of its endpoints. The stored signal may be different for different endpoints, and there may be circumstances in which it will be considered valuable to use such a comparison to distinguish between the actuator's two states.

The present invention can thus be employed in a wide range of embodiments and constitutes a significant advance in the art.

What is claimed is:

1. An actuator system comprising:
   A) a latching actuator including an armature and a coil operable by application of a coil drive thereto in a first drive direction to conduct current in a first current direction and thereby tend to drive the armature to a first end position;
   B) a sound sensor so coupled to the actuator as to sense sound made by the armature in reaching the first end position, the sound sensor generating a sensor output indicative of the sound that it senses; and
   C) a control circuit operable to begin applying coil drive to the coil in the first drive direction and responsive to the sensor output's meeting a predetermined first current-termination criterion to stop applying coil drive to the coil in the first drive direction.

2. An actuator system as defined in claim 1 wherein:
A) the coil is operable by application of a coil drive thereto in a second drive direction to conduct current in a second current direction and thereby tend to drive the armature to a second end position;
B) the sound sensor is so coupled to the actuator as to sense sound made by the armature in reaching the second end position; and
C) the control circuit is operable to begin applying coil drive to the coil in the second drive direction and responsive to the sensor output's meeting a predetermined second current-termination criterion to stop applying coil drive to the coil in the second drive direction.

3. An actuator system as defined in claim 2 wherein the first and second current-termination criteria differ.

4. An actuator system as defined in claim 1 wherein the sound sensor includes a piezoelectric transducer.

5. An actuator system as defined in claim 2 wherein, if the sensor output does not meet the first current-termination criterion within a predetermined first drive duration after the control circuit begins application of coil drive to the coil in the first drive direction, the control circuit applies coil drive to the coil in the first drive direction at a level higher than that at which it began application of coil drive to the coil.

6. An actuator system as defined in claim 5 wherein, if the sensor output does not meet the second current-termination criterion within a predetermined second drive duration after the control circuit begins application of coil drive to the coil in the second drive direction, the control circuit applies coil drive to the coil in the second drive direction at a level higher than that at which it began application of coil drive to the coil.

7. An actuator system as defined in claim 4 wherein:
A) the actuator system includes a housing that contains the armature and coil; and
B) the piezoelectric transducer is secured to the housing.

8. An actuator system as defined in claim 1 wherein, if the sensor output does not meet the first current-termination criterion within a predetermined first drive duration after the control circuit begins application of coil drive to the coil in the first drive direction, the control circuit applies coil drive to the coil in the first drive direction at a level higher than that at which it began application of coil drive to the coil.

9. An actuator system as defined in claim 6 wherein the first and second drive durations are the same.

10. A flow-control system comprising:
A) a valve operable between open and closed states;
B) a latching actuator including an armature operatively connected to the valve and further including a coil operable by application of a coil drive thereto in a first drive direction to conduct current in a first current direction and thereby tend to drive the armature to a first end position, in which the armature holds the valve in one of said open and closed states;
C) an endpoint detector that detects the armature's reaching the first end position and responds thereto by generating a detector output indicative thereof; and
D) a control circuit operable to begin application of coil drive to the coil in the first direction and responsive to the detector output indicative of the armature's reaching the first end position to stop applying coil drive to the coil in the first drive direction.

11. A flow-control system as defined in claim 10 wherein:
A) the flow-control system additionally includes an object sensor that produces an object sensor output; and
B) the control circuit's application of the coil drive to the coil is dependent on the object-sensor output.

12. A flow-control system as defined in claim 10 wherein:
A) the coil is operable by application of a coil drive thereto in a second drive direction to conduct current in a second current direction and thereby tend to drive the armature to a second end position, in which the armature holds the valve in the other of said open and closed states;
B) the endpoint detector detects the armature's reaching the second end position and responds thereto by generating a detector output indicative thereof; and
C) the control circuit is operable to begin application of coil drive to the coil in the second direction at a normal first-direction drive level and responsive to the detector output indicative of the armature's reaching the second end position to stop applying coil drive to the coil in the second drive direction.

13. A flow-control system as defined in claim 12 wherein:
A) the flow-control system additionally includes an object sensor that produces an object sensor output; and
B) the control circuit's application of the coil drive to the coil is dependent on the object-sensor output.

14. A flow-control system as defined in claim 12 wherein:
A) the endpoint detector includes a sound sensor that is so coupled to the actuator as to sense sound made by the armature in reaching the first and second end positions and generates a sensor output indicative of the sound that it senses;
B) the detector output indicates that the armature has reached the first end position if the sensor output meets a predetermined first current-termination criterion; and
C) the detector output indicates that the armature has reached the second end to position if the sensor output meets a predetermined second current-termination criterion.

15. An actuator system as defined in claim 14 wherein the sound sensor includes a piezoelectric transducer.

16. An actuator system as defined in claim 10 wherein:
A) the endpoint detector includes a sound sensor that is so coupled to the actuator as to sense sound made by the armature in reaching the first end position and generates a sensor output indicative of the sound that it senses; and
B) the detector output indicates that the armature has reached the first end position if the sensor output meets a predetermined first current-termination criterion.

17. A flow-control system as defined in claim 16 wherein:
A) the flow-control system additionally includes an object sensor that produces an object sensor output; and
B) the control circuit's application of the coil drive to the coil is dependent on the object-sensor output.

18. An actuator system as defined in claim 16 wherein the sound sensor includes a piezoelectric transducer.

19. For controlling a latching actuator including an armature and a coil operable by application of a coil drive thereto in a first drive direction to conduct current in a first current direction and thereby tend to drive the armature to a first end position, a method comprising the steps of:
A) applying coil drive to the coil in the first drive direction;
B) determining whether the armature has reached the first end position; and
C) if so, stopping application of the coil drive to the coil.

* * * * *